(12) United States Patent
Hatanaka et al.

(10) Patent No.: US 9,409,472 B2
(45) Date of Patent: Aug. 9, 2016

(54) ENGINE MOUNT

(71) Applicant: TOYOTA JIDOSHA KABUSHIKI KAISHA, Toyota-shi, Aichi-ken (JP)

(72) Inventors: Keishi Hatanaka, Yatomi (JP); Noriaki Yoshii, Nagoya (JP); Yasuo Suzuki, Komaki (JP); Hitoshi Yamaguchi, Toyokawa (JP); Shinji Komura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/718,822

(22) Filed: May 21, 2015

(65) Prior Publication Data

US 2015/0352939 A1 Dec. 10, 2015

(30) Foreign Application Priority Data

Jun. 5, 2014 (JP) .................................. 2014-117098

(51) Int. Cl.
*F16F 1/38* (2006.01)
*B60K 5/12* (2006.01)
*F16F 1/373* (2006.01)

(52) U.S. Cl.
CPC ............... *B60K 5/1208* (2013.01); *F16F 1/373* (2013.01); *F16F 1/3849* (2013.01); *F16F 1/3856* (2013.01); *F16F 2226/02* (2013.01)

(58) Field of Classification Search
CPC ............. F16F 1/36; F16F 1/38; F16F 1/3842; F16F 1/3856; F16F 1/3849; F16F 1/373; F16F 1/376; F16F 1/377; B60K 5/1208; B60K 5/1233

See application file for complete search history.

(56) References Cited

U.S. PATENT DOCUMENTS

| 4,079,168 A * | 3/1978 | Schwemmer | B29C 63/48 156/283 |
| 6,292,995 B1 * | 9/2001 | Corbin | C08J 5/124 156/307.3 |
| 8,709,195 B2 * | 4/2014 | Halladay | C09J 121/00 156/283 |
| 2006/0214341 A1 * | 9/2006 | Sugiura | F16F 1/3842 267/293 |

FOREIGN PATENT DOCUMENTS

| JP | H10-281225 A | 10/1998 |
| JP | 2009-036295 A | 2/2009 |

* cited by examiner

*Primary Examiner* — Thomas J Williams
(74) *Attorney, Agent, or Firm* — Oliff PLC

(57) ABSTRACT

Provided is an engine mount for a power unit. The power unit is supported by a support via the engine mount. The engine mount includes a first mounting bracket, a second mounting bracket, and a coating film. The coating film is applied to at least one of a surface of a first mounting portion and a surface of a second mounting portion. The coating film includes a cured-resin base layer made of a phenolic-resin adhesive, and an outer layer made of an epoxy-resin antirust paint and laminated on the cured-resin base layer. A thickness of the cured-resin base layer is 5 μm or more. A thickness of the outer layer is less than 15 μm. A sum total of the thickness of the cured-resin base layer and the thickness of the outer layer is equal to or more than 15 μm and equal to or less than 30 μm.

5 Claims, 3 Drawing Sheets

ENGINE MOUNT

INCORPORATION BY REFERENCE

The disclosure of Japanese Patent Application No. 2014-117098 filed on Jun. 5, 2014 including the specification, drawings and abstract is incorporated herein by reference in its entirety.

BACKGROUND OF THE INVENTION

1. Field of the Invention

The present invention relates to an engine mount configured to support a power unit of a vehicle or the like relative to a support such as a frame in a vibro-isolating manner.

2. Description of Related Art

Conventionally, a power unit of an automobile or the like is supported in a vibro-isolating manner by a support such as a body frame via the above engine mount. As described in Japanese Patent Application Publication No. 10-281225 (JP 10-281225 A), Japanese Patent Application Publication No. 2009-036295 (JP 2009-036295 A), and the like, the engine mount has a structure in which a first mounting bracket and a second mounting bracket to be attached to a power unit and a support, respectively, are connected to each other by a rubber elastic body, in general.

The engine mount is provided between the power unit and the support member by tightening and fixing the mounting brackets to the power unit and the support member by use of a securing bolt.

SUMMARY OF THE INVENTION

In the engine mount having such a conventional structure, a tightening torque of the securing bolt may decrease over time. When an inventor of the present invention studied on this problem, the inventor found that a main cause thereof is wear and tear of antirust coating films on surfaces of the mounting brackets. Particularly, a power unit including an internal combustion engine may be exposed to a high temperature of 80° C. or more. Therefore, an epoxy-resin antirust paint that is generally employed may decrease the tightening torque of the securing bolt due to deformation after the exposure to the high temperature in a state where the tightening torque of the securing bolt is applied thereto.

It is conceivable that an amount of wear and tear is restrained by thinning a coating film of the antirust paint. However, if the coating film is thinned, a decrease in rust prevention performance cannot be avoided. Accordingly, it is difficult to achieve both required rust prevention performance and stable maintenance of the tightening torque of the securing bolt in a balanced manner.

The present invention has been accomplished in view of the above circumstances as a background. A new structural engine mount that can maintain both rust prevention performance in mounting brackets and a tightening torque of a securing bolt is provided.

An engine mount for a power unit, according to one aspect of the present invention, is provided. The power unit is supported by a support in a vibro-isolating manner via the engine mount. The engine mount includes a first mounting bracket, a second mounting bracket, and a coating film. The first mounting bracket is attached at a first mounting portion to the support, and the second mounting bracket is attached at a second mounting portion to the power unit. The coating film is applied to at least one of a surface of the first mounting portion and a surface of the second mounting portion. The coating film includes a cured-resin base layer made of a phenolic-resin adhesive, and an outer layer made of an epoxy-resin antirust paint and laminated on the base layer. A thickness of the base layer is 5 μm or more. A thickness of the outer layer is less than 15 μm. A sum total of the thickness of the base layer and the thickness of the outer layer is equal to or more than 15 μm and equal to or less than 30 μm.

The engine mount employs a combination of the base layer made of the cured resin of the phenolic-resin adhesive, and the outer layer made of the antirust paint. The phenolic-resin adhesive has a strong fixing strength relative to metal such as iron, and has a high rigidity after curing as compared with the antirust paint. Further, the phenolic-resin adhesive has less wear and tear even after exposure to a high temperature of 80° C. or more. The base layer supplements rust prevention performance exhibited by the outer layer made of the antirust paint, thereby making it possible to secure required rust prevention performance and to restrain a thickness of the antirust paint. Therefore, the coating film having a two-layer structure can restrain an amount of wear and tear of the antirust paint due to heat, so as to stabilize a tightening torque of a securing bolt, and can achieve excellent rust prevention performance at the same time. Note that the coating film may be applied to both the surface of the first mounting portion and the surface of the second mounting portion. The tightening torque due to the securing bolt or the like is applied to the first mounting portion and the second mounting portion. The coating film may be applied to only the first mounting portion, to which the tightening torque due to the securing bolt or the like is applied. The coating film may be applied to only the second mounting portion, to which a tightening torque due to the securing bolt or the like is applied.

According to the above aspect, the thickness Ta of the cured-resin base layer made of the phenolic-resin adhesive is set to 5 μm or more. This makes it possible to sufficiently obtain a supplemental effect of the rust prevention performance by the base layer, thereby resulting in that the thickness of the outer layer can be restrained. Further, by restraining the thickness of the outer layer made of the epoxy-resin antirust paint to be less than 15 μm, it is possible to effectively restrain wear and tear of the coating film at the time when the coating film is exposed to a high temperature. Thus, a decrease in a tightening torque of the securing bolt, caused due to the wear and tear of the coating film, is suppressed effectively, thereby making it possible to achieve rust prevention performance and stable maintenance of the tightening torque of the securing bolt in a balanced manner. When a total thickness (Ta+Tb) is less than 15 μm, sufficient rust prevention performance is hard to be exhibited, and when the total thickness (Ta+Tb) exceeds 30 μm, a long-term wear and tear due to heat or the like might become a problem for maintaining the tightening torque of the securing bolt.

In the above aspect, the thickness Ta of the base layer and the thickness Tb of the outer layer may be Tb≤Ta. By setting the thickness Ta of the base layer and the thickness Tb of the outer layer to the above range, the rust prevention performance and the stable maintenance of the tightening torque of the securing bolt can be achieved still more effectively in a balanced manner. If the rust prevention performance is secured in a state where the thickness Tb of the outer layer is larger than the thickness Ta of the base layer, it is difficult to secure the tightening torque of the bolt over a long period, which may make it difficult to maintain both the rust prevention performance and the tightening torque of the securing bolt in a balanced manner.

In the above aspect, the thickness Tb of the outer layer may be 5 μm or more. In the engine mount in which the thickness Tb of the outer layer is set to 5 μm or more, it is possible to restrain a total thickness and to obtain successful rust prevention performance effectively.

In the above aspect, the thickness of the outer layer may be not more than 10 μm.

In the above aspect, the coating film may be applied to a surface of the second mounting portion. The second mounting bracket is attached at the second mounting portion to the power unit. By employing the coating film having the aforementioned two-layer structure in a securing-bolt tightening part that is easy to be exposed to a high temperature due to heat transmission from the power unit, it is possible to secure the rust prevention performance and to prevent looseness of the securing bolt effectively. This can achieve an improvement in performance and reliability of a vibro-isolating support structure of the power unit.

In the engine mount according to the above aspect, the coating film having a laminated structure of a combination of specific materials and specific thicknesses is employed. This makes it possible to secure required rust prevention performance and to stably maintain a tightening torque by a securing bolt even under a situation in which the engine mount is exposed to a high temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
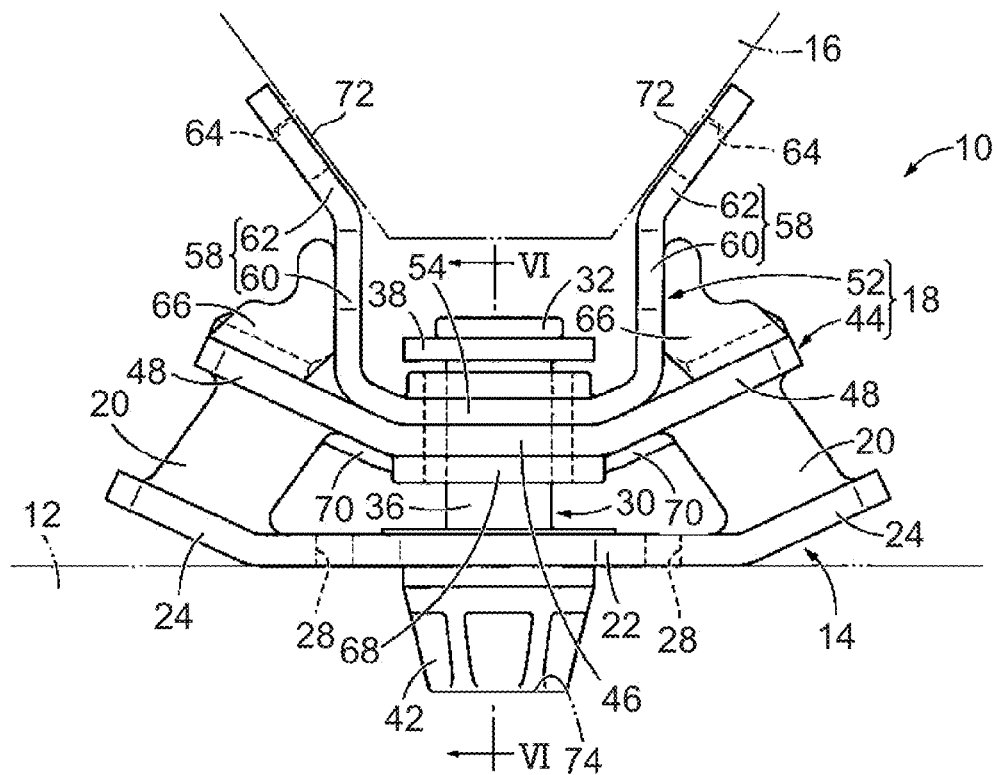
FIG. 1 is a front view illustrating an engine mount according to one embodiment of the present invention.
Figure 2:
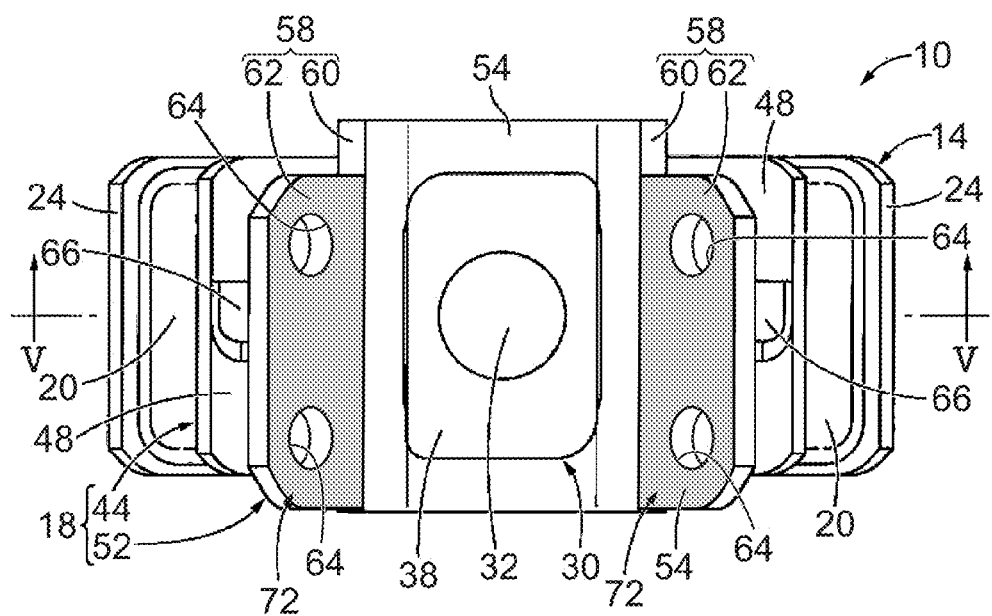
FIG. 2 is a plain view of the engine mount illustrated in FIG. 1.
Figure 3:
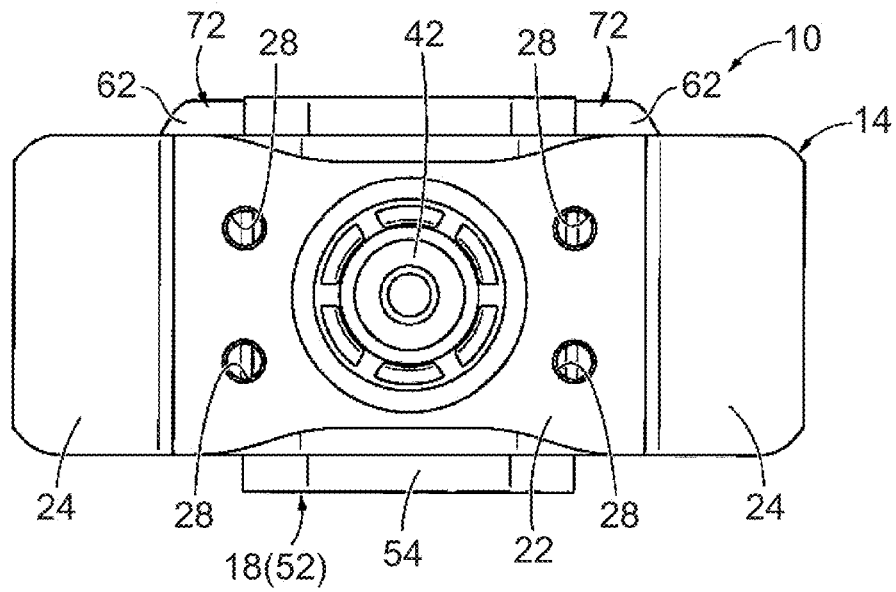
FIG. 3 is a bottom view of the engine mount illustrated in FIG. 1.
Figure 4:
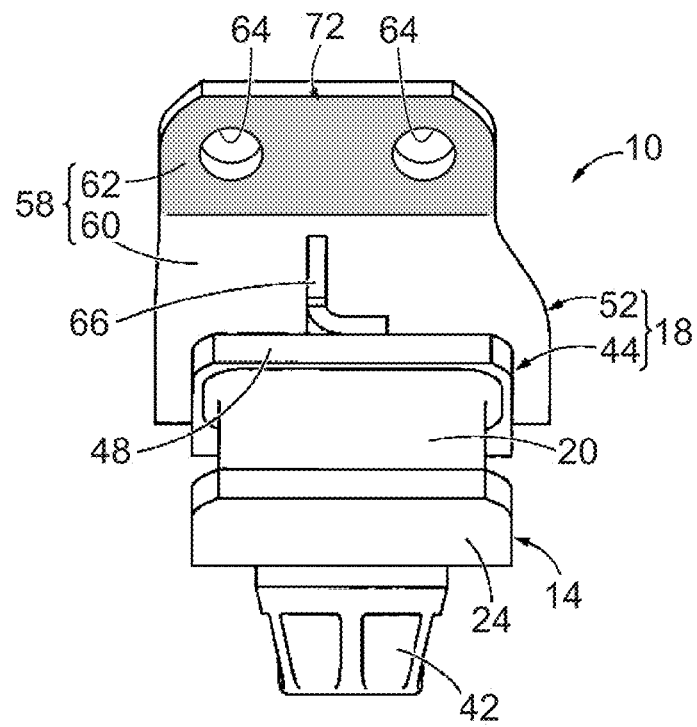
FIG. 4 is a right side view of the engine mount illustrated in FIG. 1.

An embodiment of the present invention will be described below with reference to the drawings.

First, FIGS. 1 to 6 illustrate an engine mount 10 as one embodiment of the present invention. The engine mount 10 has a structure in which a first mounting bracket 14 and a second mounting bracket 18 are elastically connected to each other via paired support rubber elastic bodies 20, 20. The first mounting bracket 14 is attached to a vehicle body 12 as a support, and the second mounting bracket 18 is attached to a power unit 16 including an engine and a transmission. Due to such a structure, the power unit 16 is supported by the support 12 in a vibro-isolating manner. Note that, in the following description, an up-down direction indicates an up-down direction in FIG. 1 that is a generally vertically up-down direction in a vehicle mounted state, a right-left direction indicates a right-left direction in FIG. 1 that is a generally vehicle right-left direction in a vehicle mounted state, and a front-rear direction indicates an up-down direction in FIG. 2 that is a generally vehicle front-rear direction in a vehicle mounted state, unless otherwise stated.

More specifically, the first mounting bracket 14 has a generally rectangular plate shape elongated in the right-left direction, and is a high-rigidity member made of metal such as iron or aluminum alloy. Further, the first mounting bracket 14 has a structure in which paired first inclined plate portions 24, 24 are formed integrally with right and left sides of a first mounting portion 22 provided in an intermediate part in its lengthwise direction. The first mounting portion 22 has a flat shape and expands generally horizontally. A bolt hole 26 is formed in a central part of the first mounting portion 22 in a penetrating manner in a thickness direction, and two first tightening holes 28, 28 are formed at right and left sides of the bolt hole 26 in a penetrating manner in the thickness direction.

The first inclined plate portions 24, 24 are formed on the right and left sides of the first mounting portion 22, respectively, and have inclined plate shapes inclined upward and outward in the right-left direction. Note that an inclination angle of the first inclined plate portions 24, 24 is not limited particularly, and is set according to required spring characteristics or the like, appropriately.

Figure 5:
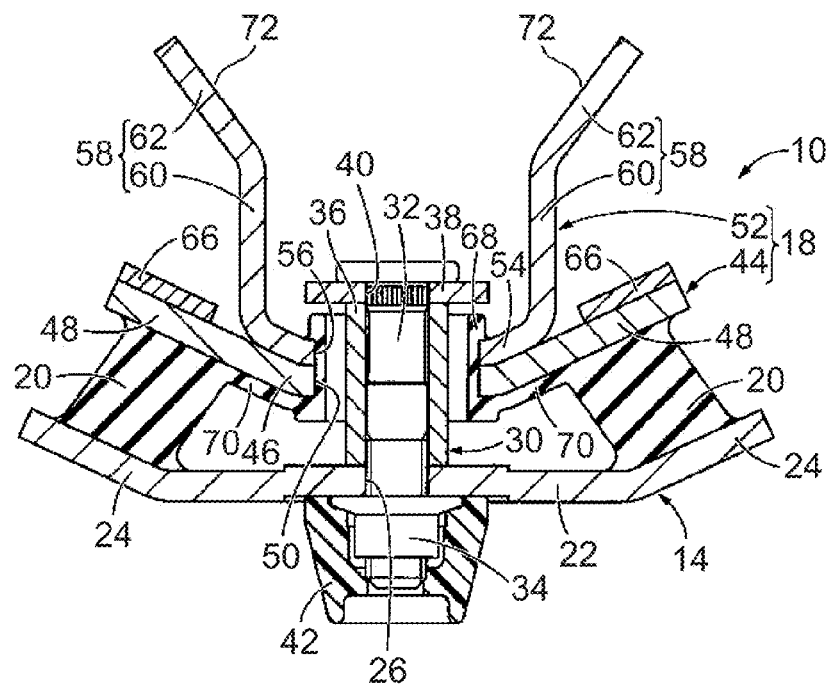
FIG. 5 is a sectional view taken along a line V-V in FIG. 2.
Figure 6:
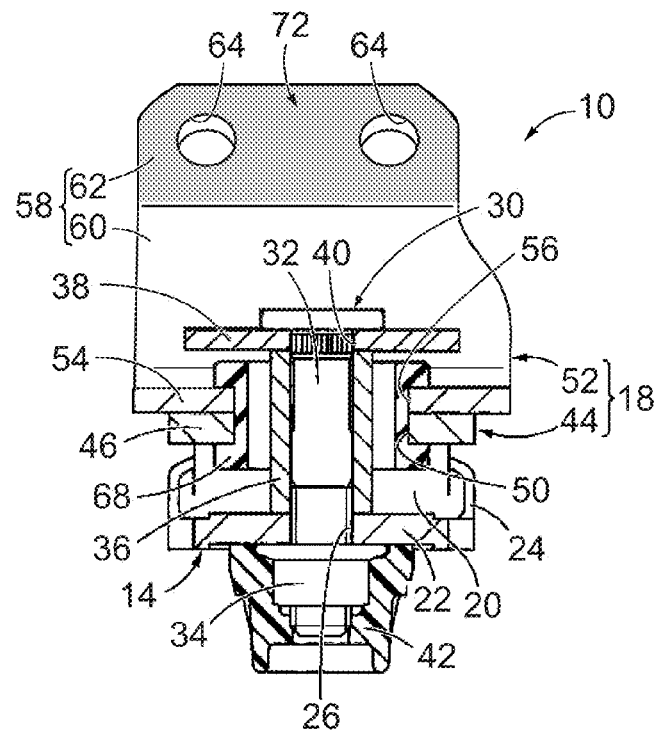
FIG. 6 is a sectional view taken along a line VI-VI in FIG. 1.

A stopper shaft member 30 is fixed to the first mounting bracket 14. As illustrated in FIG. 5, the stopper shaft member 30 has a structure in which a nut 34 is tightened to a stopper bolt 32 passed through the bolt hole 26 of the first mounting bracket 14. Further, a head side of the stopper bolt 32 projects upward from the first mounting portion 22 of the first mounting bracket 14. Further, the stopper bolt 32 is passed through a spacer sleeve 36, and is passed through a through hole 40 formed in a center of a stopper plate 38. The spacer sleeve 36 and the stopper plate 38 are held fixedly by being sandwiched between the head of the stopper bolt 32 and the first mounting bracket 14 in the up-down direction.

A cap 42 is attached to the nut 34. The cap 42 is a member made of synthetic resin and having a generally cylindrical shape, and is outwardly engaged with the nut 34 so as to cover the nut 34 and a lower end of the stopper bolt 32 projecting below the first mounting portion 22 of the first mounting bracket 14.

The second mounting bracket 18 includes a fixing metal fitting 44. Similarly to the first mounting bracket 14, the fixing metal fitting 44 is a metal member having a generally rectangular plate shape elongated in the right-left direction. The fixing metal fitting 44 is shorter than the first mounting bracket 14 in the right-left direction. Further, the fixing metal fitting 44 has a structure in which paired second inclined plate portions 48, 48 are formed integrally with right and left sides of a support plate portion 46 provided in an intermediate part of the fixing metal fitting 44 in its lengthwise direction. The support plate portion 46 has a flat shape and expands generally horizontally, and an insertion hole 50 is formed in a central part of the support plate portion 46 in a penetrating manner in a thickness direction.

The second inclined plate portions 48, 48 are formed on right and left sides of the support plate portion 46, respectively, and have inclined plate shapes inclined upward and outward in the right-left direction, similarly to the first inclined plate portions 24, 24. Note that an inclination angle of the second inclined plate portions 48, 48 are not limited particularly, and are set according to required spring characteristics or the like, appropriately. For example, the inclination angle may be generally the same as the inclination angle of the first inclined plate portion 24.

Further, the second mounting bracket 18 includes a fastening metal fitting 52. The fastening metal fitting 52 is a metal member formed separately from the fixing metal fitting 44, and its intermediate part in the right-left direction includes a central connecting plate portion 54 expanding generally horizontally. Further, an insertion hole 56 is formed in a central part of the central connecting plate portion 54 in a penetrating manner in a thickness direction. Note that right and left ends of the central connecting plate portion 54 have inclined shapes that are inclined upward and outward in the right-left direction, so as to correspond to the second inclined plate portions 48, 48 of the fixing metal fitting 44.

Paired fastening plate portions 58, 58 are formed integrally with the right and left sides of the central connecting plate portion 54, and extend upward toward the power unit 16. The fastening plate portions 58, 58 each include a rising portion 60 and a second mounting portion 62.

The rising portions 60 have a generally plate shape expanding in the up-down direction and in the front-rear direction. The rising portions 60 are provided so as to project upward from right and left ends of the central connecting plate portion 54, and thus, the rising portions 60, 60 provided in pair are placed so as to face each other at a predetermined distance in the right-left direction. Note that it is preferable to set the rising portions 60, 60 to have an inclination angle larger than the inclination angle of the second inclined plate portions 48, 48. In the present embodiment, the rising portions 60, 60 have an inclination angle of generally 90°.

Further, the second mounting portions 62, 62 project outward in the right-left direction from the rising portions 60, 60. The second mounting portions 62, 62 have a generally plate shape and are inclined upward and outward in the right-left direction. Further, two second tightening holes 64, 64 are formed so as to penetrate the second mounting portions 62, 62 in a thickness direction. Note that an inclination angle of the second mounting portions 62, 62 are not limited particularly, and are set appropriately according to a mounting angle to the power unit 16, and the like. The inclination angle is preferably set to be smaller than the inclination angle of the rising portions 60, 60.

The central connecting plate portion 54 of the fastening metal fitting 52 is superimposed on the support plate portion 46 of the fixing metal fitting 44 from above in an abutting manner, and fixed thereto by welding. Hereby, the second mounting bracket 18 is formed. Note that those right and left ends of the central connecting plate portion 54 which have an inclined shape are superimposed on the second inclined plate portions 48, 48 of the fixing metal fitting 44.

Note that, in the present embodiment, reinforcing members 66, 66 are each disposed between each of the second inclined plate portions 48, 48 of the fixing metal fitting 44 and each of the rising portions 60, 60 of the fastening metal fitting 52. The reinforcing members 66, 66 are metal members having a flexed plate shape. The reinforcing members 66, 66 are superimposed on top faces of the second inclined plate portions 48, 48, and also superimposed on right and left external surfaces of the rising portions 60, 60, so as to be fixed thereto by welding. Hereby, outward slant, in the right-left direction, and deformation of the rising portions 60, 60 are prevented by the reinforcing members 66, 66.

The first mounting bracket 14 and the second mounting bracket 18 are placed at a predetermined distance in the up-down direction. The first mounting bracket 14 and the second mounting bracket 18 are elastically connected to each other via the paired support rubber elastic bodies 20, 20. Note that the stopper shaft member 30 attached to the first mounting bracket 14 is passed through the insertion holes 50, 56 of the second mounting bracket 18 with a radial gap. The stopper plate 38 is placed above the central connecting plate portion 54 of the fixing metal fitting 44 at a predetermined distance.

The support rubber elastic bodies 20, 20 each have a rectangular block shape gradually inclined inwardly in the right-left direction toward an upper side. Lower ends of the support rubber elastic bodies 20, 20 are vulcanized and joined to the first inclined plate portions 24, 24 of the first mounting bracket 14, and upper ends of the support rubber elastic bodies 20, 20 are vulcanized and joined to the second inclined plate portions 48, 48 of the second mounting bracket 18. In the present embodiment, the paired support rubber elastic bodies 20, 20 are vulcanized and molded, so as to be integrated with the first mounting bracket 14 and the second mounting bracket 18.

Further, a cushion rubber 68 is adhered to edge parts of the insertion holes 50, 56 of the second mounting bracket 18. The cushion rubber 68 has a generally cylindrical shape, and is adhered so as to cover inner peripheral surfaces of the insertion holes 50, 56. An inner peripheral surface of the cushion rubber 68 is placed so as to be opposed to an outer peripheral surface of the stopper shaft member 30 in a radial direction across a radial gap. Further, the cushion rubber 68 projects outwardly in the up-down direction relative to the insertion holes 50, 56. Further, an upper end portion of the cushion rubber 68 is provided between the stopper plate 38 and the central connecting plate portion 54 of the second mounting bracket 18 across an axial gap in the up-down direction. Further, a lower end portion of the cushion rubber 68 is provided between the first mounting portion 22 of the first mounting bracket 14 and the support plate portion 46 of the second mounting bracket 18 across an axial gap in the up-down direction. Note that the cushion rubber 68 is connected to the support rubber elastic bodies 20, 20 by connecting rubber layers 70, 70 adhered to a bottom face of the fixing metal fitting 44, so as to be integrated therewith.

In the present embodiment, coating films 72, 72 are formed on surfaces of the second mounting portions 62, 62 of the second mounting bracket 18. As shown in gray in the figure, the coating films 72, 72 are provided on both top and bottom side surfaces of the second mounting portions 62, 62 from their head portions to their base end portions. Note that the coating films 72, 72 in the figure are illustrated with a thickness dimension larger than their actual dimension for obviousness.

The coating film 72 has a laminated structure in which an outer layer made of an epoxy-resin antirust paint is deposited on a base layer of a cured resin made of a phenolic-resin adhesive. That is, base layers are formed on surfaces of the second mounting portions 62, 62, and outer layers are formed on surfaces of the base layers.

Materials of the phenolic-resin adhesive forming the base layers and the epoxy-resin antirust paint forming the outer layers are both thermo setting resins. Particularly, in the present embodiment, an air-drying resin is employed as an epoxy resin as the material of the antirust paint, so that a sufficient curing property can be exhibited in a dry state without applying heat thereto in particular. In the meantime, a resin cured by heating is employed as a phenolic resin as the material of the adhesive, so that a hardness of the base layer is larger than a hardness of the outer layer after curing. Note that it is preferable to use heat of vulcanization of the support rubber elastic bodies 20, 20, as heat to cure the base layers.

An example of the material of such a phenolic-resin adhesive is "Chemlok 205" made by Lord Corporation. In the meantime, an example of the material of the antirust paint made of the epoxy resin is "TMA Super Black EXD" made by Dai Nippon Toryo Co., Ltd.

Herein, a thickness of the base layer is indicated by Ta (μm), and a thickness of the outer layer is indicated by Tb (μm). In the above embodiment, a whole thickness dimension (Ta+Tb) of the coating film 72 is set within a range of 15

μm≤(Ta+Tb)≤30 μm, and is preferably Tb≤Ta. The reason is as follows. When the thickness dimension (Ta+Tb) of the coating film 72 is less than 15 μm, the after-mentioned rust prevention performance by the coating film 72 might not be provided sufficiently. In addition, when the thickness dimension (Ta+Tb) of the coating film 72 is larger than 30 μm, an amount of wear and tear of the coating film 72 increases. This may result in that the after-mentioned bolt-looseness prevention effect cannot be obtained sufficiently. Further, by setting the thickness Ta of the base layer to be equal to or more than the thickness Tb of the outer layer (Tb≤Ta), it is possible to restrain an amount of wear and tear by setting the thickness Tb of the outer layer to be small. Also, by setting the base layer having a sufficient thickness Ta, it is possible to exhibit the rust prevention performance in cooperation with the outer layer and the base layer. Accordingly, by setting the thickness Ta of the base layer to be equal to or more than the thickness Tb of the outer layer (Tb≤Ta), the bolt-looseness prevention effect and the rust prevention performance can be realized still more effectively in a balanced manner.

Further, the thickness Ta of the base layer is set to 5 μm≤Ta, preferably set to 10 μm≤Ta≤25 μm, and more preferably set within a range of 15 μm≤Ta≤20 μm. In the meantime, the thickness Tb of the outer layer is set to Tb<15 μm, preferably set to 5 μm≤Tb<15 μm, and more preferably set within a range of 5 μm≤Tb≤10 μm. The reason is as follows. Even in a case where a requirement of 15 μm≤(Ta+Tb)≤30 μm is satisfied, if the thickness Ta of the base layer is smaller than 5 μm or if the thickness Tb of the outer layer is 15 μm or more, sufficient rust prevention performance may not be exhibited or the amount of wear and tear may increases and the bolt-looseness prevention effect may not be obtained sufficiently.

The coating films 72, 72 are provided on the surfaces of the second mounting portions 62, 62 of the second mounting bracket 18 as such. Thus, the engine mount 10 of the present embodiment is formed. As virtually illustrated in FIG. 1, the first mounting portion 22 of the first mounting bracket 14 is attached to the vehicle body 12 by attachment bolts (not shown) passed through respective first tightening holes 28. Further, the second mounting portions 62, 62 of the second mounting bracket 18 are attached to the power unit 16 by attachment bolts (not shown) passed through respective second tightening holes 64. Hereby, the engine mount 10 is mounted between the vehicle body 12 and the power unit 16, so that the power unit 16 is supported by the vehicle body 12 in a vibro-isolating manner. Note that, in FIG. 1, the vehicle body 12 and the power unit 16 are illustrated virtually, but the engine mount 10 is illustrated in a single-body state in which no distributed support load of the power unit 16 is input therein. Further, FIG. 1 does not illustrate deformation of the support rubber elastic bodies 20, 20 due to the distributed support load and close displacement between the first mounting bracket 14 and the second mounting bracket 18.

In the present embodiment, at the time when the engine mount 10 is mounted on the vehicle, the cap 42 covering the stopper bolt 32 and the nut 34 is inserted into a recess 74 formed in the vehicle body 12. Hereby, the first mounting bracket 14 is positioned relative to the vehicle body 12 easily and accurately, thereby making it possible to easily perform an operation of bolt fixation to the first tightening hole 28.

In the engine mount 10 of the present embodiment, the coating film 72 are provided on those surfaces of the second mounting portions 62, 62 which are tightening surfaces between the power unit 16 and the second mounting bracket 18. By introduction of the coating film, the bolt-looseness prevention effect and the rust prevention performance can be achieved in a balanced manner. The coating film 72 has a laminated structure of the base layer made of the phenol-resin adhesive and the outer layer made of the epoxy-resin antirust paint. That is, by employing the base layer and the outer layer having thicknesses within a predetermined range, it is possible to restrain the amount of wear and tear to be small with respect to heat, thereby resulting in that a tightening torque of the bolt can be maintained over a long period. Further, since the rust prevention performance is exhibited in cooperation with the base layer and the outer layer, even if a thickness dimension of an antirust-paint layer is reduced as compared with a conventional technique, a sufficient rust prevention effect can be secured.

In the present embodiment, the coating films 72, 72 having the aforementioned specific structure including two layers are provided on that tightening surface of the power unit 16 which has a higher temperature, that is, the surfaces of the second mounting portions 62, 62. Accordingly, it is possible to maintain the rust prevention performance and to effectively restrain the amount of wear and tear relative to heat. This can effectively solve a problem of a conventional engine mount with a decrease in a tightening torque, and can secure the rust prevention performance. The following describes test results using the embodiment of the present invention and test pieces, so as to deepen comprehension of the present invention.

[Looseness Evaluation Result by Use of Embodiment]

By use of the engine mount 10 of the above embodiment, a looseness evaluation test of a bolt tightening torque was performed. In the looseness evaluation test, as illustrated in FIG. 1, a base member corresponding to the vehicle body 12 and the first mounting bracket 14 were fixed by a securing bolt passed through the first tightening hole 28. Further, a vibrating member corresponding to the power unit 16 and the second mounting bracket 18 were tightened by a securing bolt passed through the second tightening hole 64. Both of the securing bolts had an initial fastening torque of 37.6 (N m).

The engine mount 10 used in the looseness evaluation test was subjected to a vibration test under an atmospheric temperature of generally 100° C. In the vibration test, a vibration force of ±5000N was applied to the engine mount 1000 times at a period of 2 Hz. A vibration direction was an up-down direction, which is a direction in which the first mounting bracket 14 and the second mounting bracket 18 face each other. The vibration force of ±5000N was derived from a distributed support load to the engine mount in a power unit supporting state.

In the present embodiment, the phenolic-resin adhesive and the epoxy-resin antirust paint were used as a coating film on both surfaces of the first and second mounting brackets 14, 18. Respective thicknesses Ta, Tb shown in the following [Table 1] and [Table 2] were applied to the phenolic-resin adhesive and the epoxy-resin antirust paint, and a test was performed under the same condition. Further, "Chemlok 205" made by Lord Corporation was used as a phenolic resin forming an adhesive layer, and "TMA Super Black EXD" made by Dai Nippon Toryo Co., Ltd. was used as an epoxy resin forming an antirust-paint layer.

After the vibration test, looseness of the securing bolt was evaluated in a tightened part by the securing bolt. Such an evaluation was performed by measuring a remaining torque of each securing bolt. An amount of wear and tear of the coating film was measured based on a change in a thickness at a part where the securing bolt was removed. Looseness evaluation results obtained by the measurement are shown in [Table 1] and [Table 2].

Note that the looseness evaluation results are shown as follows. A test piece in which 55% or more of the initial fastening torque was maintained as a fastening torque was indicated by "no looseness." Further, a test piece of which a fastening torque did not satisfy the above criterion was indicated by "with looseness."

TABLE 1

|  |  | Thickness Ta (μm) of phenolic-resin adhesive | | |
|---|---|---|---|---|
|  |  | 0 | 5-10 | 15-20 |
| Thickness Tb (μm) of epoxy-resin antirust paint | 0 | No looseness Occurrence of rust >10% | No looseness Occurrence of rust >10% | No looseness Occurrence of rust ≤10% |
|  | 5-10 | No looseness Occurrence of rust >10% | No looseness No rust [Table 2] | No looseness No rust |
|  | 15-20 | With looseness No rust | With looseness No rust | With looseness No rust |

TABLE 2

|  |  | Thickness Ta (μm) of phenolic-resin adhesive | |
|---|---|---|---|
|  |  | About 5 | About 10 |
| Thickness Tb (μm) of epoxy-resin antirust paint | About 5 | Occurrence of rust >10% | No rust |
|  | About 10 | No rust | No rust |

[Rust Prevention Evaluation Result by Test Pieces]

In a rust prevention evaluation test, a test piece made of a widely used hot-rolled sheet steel (SPH) and having a rectangular flat shape with a thickness of 5 mm was used as the first and second mounting brackets. Test pieces were each prepared such that the phenolic-resin adhesive and the epoxy-resin antirust paint were applied to a metal fitting for test with any of respective thicknesses Ta, Tb shown in the above [Table 1] and [Table 2] under the same condition. Note that, in each of the test pieces, "Chemlok 205" made by Lord Corporation was used as the phenolic resin forming an adhesive layer, and "TMA Super Black EXD" made by Dai Nippon Toryo Co., Ltd. was used as an epoxy resin forming an antirust-paint layer.

Then, each of the test pieces thus prepared was subjected to a test to spray salt water thereon, and an occurrence of rust was examined by visual observation. Results thereof were shown in the above [Table 1] and [Table 2]. Note that the test to spray salt water was performed according to JISZ2371. Rust prevention performance was evaluated in such a manner that a salt solution was sprayed on a surface of a test piece, the test piece was supported perpendicularly, and a surface quality of the test piece after 480 hours was observed by visual observation. Results of the rust prevention evaluation were shown as follows: a test piece in which peeling of a coating film and an occurrence of rust were not observed is indicated by "no rust," a test piece in which peeling of a coating film and an occurrence of rust were observed in 10% or less of a surface is indicated by "occurrence of rust≤10%," and a test piece in which peeling of a coating film and an occurrence of rust were observed in more than 10% of a surface is indicated by "occurrence of rust>10%."

From the test results, it is found that successful performance to keep a bolt tightening torque and rust prevention performance are both achieved in a balanced manner in any of the following cases: a case where the thickness Ta of the phenolic-resin adhesive is about 5 (μm) and the thickness Tb of the epoxy-resin antirust paint is about 10 (μm); a case where the thickness Ta of the phenolic-resin adhesive is about 10 (μm) and the thickness Tb of the epoxy-resin antirust paint is about 5 (μm) or about 10 (μm); and a case where the thickness Ta of the phenolic-resin adhesive is about 15 to 20 (μm) and the thickness Tb of the epoxy-resin antirust paint is about 5 to 10 (μm).

Further, when the thickness Tb of the epoxy-resin antirust paint is too large, an amount of wear and tear becomes large, which may decrease a bolt tightening torque. Further, when the thickness Tb of the epoxy-resin antirust paint or a whole thickness dimension (Ta+Tb) of the coating film 72 is too small, a rust prevention effect may not be exhibited sufficiently.

The present invention is not limited to the specific description of the above embodiment. For example, in the above embodiment, the coating films 72, 72 are formed on those surfaces of the second mounting portions 62, 62 which are bolt tightening surfaces between the power unit 16 and the second mounting bracket 18. However, in addition to that or instead of that, a coating film may be formed on that surface of the first mounting portion 22 which is a bolt tightening surface between the vehicle body 12 and the first mounting bracket 14. Note that the coating film 72 having a two-layer structure according to the present invention does not need to be formed on an entire securing-bolt tightening surface of the first or second mounting portion 22, 62, but the coating film 72 may be formed at least in a region to which a tightening torque is applied.

Further, a manufacturing process of an engine mount, including a curing process of the phenolic-resin adhesive, is not limited in particular in the present invention. For example, an application process and a curing process of the phenolic-resin adhesive, an application process and a curing process of the antirust coating film, and a molding process and a vulcanization process of the support rubber elastic body 20, and the like processes can be performed separately in consideration of process order or can be performed at the same time, appropriately. The application process may be divided into a plurality of steps to be performed.

Further, the shapes of the first mounting bracket 14 and the second mounting bracket 18 shown in the above embodiment are just examples, and are not limited in particular. That is, specific shapes and structures of the first and second mounting brackets 14, 18 can be modified in design, appropriately. For example, the first and second mounting brackets 14, 18 may be configured to include a bracket metal fitting that is conventionally employed as needed.

What is claimed is:

1. An engine mount for a power unit, the power unit being supported by a support in a vibro-isolating manner via the engine mount, the engine mount comprising:
   a first mounting bracket configured to be attached at a first mounting portion to the support;
   a second mounting bracket configured to be attached at a second mounting portion to the power unit, the first mounting bracket and the second mounting bracket are connected to each other via a rubber elastic body; and
   a coating film configured to be applied to at least one of a surface of the first mounting portion and a surface of the second mounting portion,
   the coating film including a cured-resin base layer made of a phenolic-resin adhesive, and an outer layer made of an epoxy-resin antirust paint and laminated on the cured-resin base layer,
   a thickness of the cured-resin base layer being 5 μm or more,
   a thickness of the outer layer being less than 15 μm, a sum total of the thickness of the cured-resin base layer and the thickness of the outer layer being equal to or more than 15 μm and equal to or less than 30 μm.

2. The engine mount according to claim 1, wherein the thickness of the cured-resin base layer is at least the thickness of the outer layer or more.

3. The engine mount according to claim 1, wherein the thickness of the outer layer is 5 μm or more.

4. The engine mount according to claim 1, wherein the thickness of the outer layer is 10 μm or less.

5. The engine mount according to claim 1, wherein the coating film is configured to be applied to the surface of the second mounting portion.

* * * * *